(12) United States Patent
Liu et al.

(10) Patent No.: US 12,172,175 B2
(45) Date of Patent: Dec. 24, 2024

(54) VARIABLE-RATE SPRAY CONTROL SYSTEM BASED ON ANNULAR APPLICATION STRUCTURE AND TREE CANOPY VOLUME CALCULATION METHOD THEREOF

(71) Applicant: Jiangsu University, Jiangsu (CN)

(72) Inventors: Hui Liu, Jiangsu (CN); Jinming Chen, Jiangsu (CN); Yue Shen, Jiangsu (CN); Xuan Zhang, Jiangsu (CN); Yunpeng Duan, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/039,288

(22) PCT Filed: Feb. 15, 2022

(86) PCT No.: PCT/CN2022/076343
§ 371 (c)(1),
(2) Date: May 30, 2023

(87) PCT Pub. No.: WO2023/082482
PCT Pub. Date: May 19, 2023

(65) Prior Publication Data
US 2024/0299966 A1    Sep. 12, 2024

(30) Foreign Application Priority Data

Nov. 11, 2021 (CN) .......................... 202111331009.7

(51) Int. Cl.
*B05B 12/12* (2006.01)
*G01S 17/89* (2020.01)
*G06V 20/10* (2022.01)

(52) U.S. Cl.
CPC ............ *B05B 12/122* (2013.01); *G01S 17/89* (2013.01); *G06V 20/188* (2022.01)

(58) Field of Classification Search
CPC ...... B05B 12/122; G01S 17/89; G06V 20/188
See application file for complete search history.

(56) References Cited

FOREIGN PATENT DOCUMENTS

| CN | 107125229 | | 9/2017 | |
|----|-----------|---|--------|----|
| CN | 109407112 A | * | 3/2019 | ............ G01B 11/00 |

(Continued)

OTHER PUBLICATIONS

"International Search Report (Form PCT/ISA/210) of PCT/CN2022/076343," mailed on Aug. 17, 2022, with English translation thereof, pp. 1-6.

(Continued)

*Primary Examiner* — Chad G Erdman
(74) *Attorney, Agent, or Firm* — JCIPRNET (57) ABSTRACT

The present disclosure provides a variable-rate spray control system based on an annular application structure and a tree canopy volume (TCV) calculation method thereof. The TCV calculation method includes: acquiring in real time, by using vertical/horizontal scanning two-dimensional (2D) LiDAR, point cloud data of a variable-rate sprayer in motion in an orchard environment; acquiring speed information of the variable-rate sprayer by using a speed sensor; dividing spraying regions according to an angle at which contacts of nozzles on an annular application structure are mutually spaced on an arc; filtering interferences by setting a threshold range, calculating a sector area of a tree canopy according to trunk distance information from the horizontal LiDAR and point cloud information from the vertical LiDAR within the threshold range, and calculating a TCV in combination with the information of the speed sensor and a scanning cycle of the vertical LiDAR.

4 Claims, 5 Drawing Sheets (56) References Cited

FOREIGN PATENT DOCUMENTS

| | | |
|---|---|---|
| CN | 110476941 | 11/2019 |
| CN | 211129521 | 7/2020 |
| CN | 111543412 | 8/2020 |
| CN | 211153487 | 8/2020 |
| CN | 111838110 | 10/2020 |
| CN | 212279614 | 1/2021 |
| CN | 113341961 | 9/2021 |
| DE | 102015119026 | 5/2017 |
| JP | 2010268692 | 12/2010 |
| JP | 2011244695 | 12/2011 |

OTHER PUBLICATIONS

"Written Opinion of the International Searching Authority (Form PCT/ISA/237) of PCT/CN2022/076343," mailed on Aug. 17, 2022, pp. 1-4.

* cited by examiner

VARIABLE-RATE SPRAY CONTROL SYSTEM BASED ON ANNULAR APPLICATION STRUCTURE AND TREE CANOPY VOLUME CALCULATION METHOD THEREOF

CROSS-REFERENCE TO RELATED APPLICATION

This application is a 371 of international application of PCT application serial no. PCT/CN2022/076343, filed on Feb. 15, 2022, which claims the priority benefit of China application no. 202111331009.7, filed on Nov. 11, 2021. The entirety of each of the above mentioned patent applications is hereby incorporated by reference herein and made a part of this specification.

TECHNICAL FIELD

The present disclosure relates to tree canopy volume (TCV) calculation methods, and in particular to a TCV calculation method for variable-rate spray based on an annular application structure.

BACKGROUND

Intelligent application is of importance to the variable-rate spray technology (VRST). Through a reasonable application rate, the pest control and the environmental benefit are organically unified. While importance is increasingly attached to fruit quality and environmental safety in China, variable-rate application has been recognized by more fruit growers. Accurate TCV calculation is considered as a basis for determining output flows of solenoid valves and a premise for realizing a variable-rate spray function in orchards. For a common TCV-based calculation model (tree row volume, TRV), it is assumed that a row of trees is composed of a cuboid TCV. Data from LiDAR is converted into Cartesian coordinates. According to distances from trunks to the LiDAR, height differences between adjacent data points, and distances from the data points to the outside of the canopy, areas are calculated. In combination with speeds and scanning time, volumes are calculated. The discrete cuboid volumes are added to obtain an approximate volume at a single side of the tree canopy. The calculation model is applicable to a common profiling sprayer, in which an application structure is vertically provided at two sides to calculate the TCV in cooperation with a canopy model. In present markets, a sprayer with an annular application structure has different spray coverage range and angle over the sprayer with the application structure at two sides. For the variable-rate sprayer with the annular application structure, the TRV is far from satisfactory. In view of this, a TCV calculation method for variable-rate spray based on an annular application structure is provided.

SUMMARY

The present disclosure provides a TCV calculation method in combination with characteristics of an annular application structure and scanning characteristics of a LiDAR, to make a variable-rate sprayer more universal and compact. The method can calculate the TCV more quickly without transforming polar coordinates into rectangular coordinates, and this method is applicable to not only environmental detection of orchards, but also TCV calculation of multiple environments such as nurseries and vineyards.

Technical solutions of the present disclosure are as follows.

A TCV calculation method for a sprayer with an annular application structure based on a two-dimensional (2D) LiDAR and a speed sensor includes the following steps:

step 1: acquiring, by a robot operating system (ROS), environmental information of an orchard in real time by using vertical/horizontal scanning LiDAR; detecting a trunk distance by using the horizontal scanning LiDAR through point-cloud clustering; and acquiring, by a speed sensor, a real-time travel speed of the sprayer with the annular application structure; step 2: dividing spraying regions according to characteristics of the annular application structure and parameters of the vertical scanning LiDAR, the regions respectively corresponding to spraying ranges of nozzles, setting a threshold range through trunk distance information obtained by horizontal laser clustering, in combination with an angle range of a blended sector, a mounting position of the vertical scanning LiDAR, and an upper height limit of a fruit tree; step 3: calculating effective laser point clouds within the threshold range, segmenting a tree canopy longitudinally in a manner of a laser scanning cycle, and calculating, according to adjacent point clouds in each of the spraying regions, a sector area of each of the spraying regions; and step 4: taking n consecutive frames of LiDAR data as one spray unit, taking a maximum area for the n frames of data as an area of the spray unit, and obtaining a TCV in combination with speed information from the speed sensor and a scanning cycle of the LiDAR.

Further, the step 2 specifically includes:

providing centers of the vertical LiDAR and the application structure on the same horizontal line, to avoid unnecessary correction; dividing the spraying regions according to an angle at which contacts of the nozzles on the annular application structure are mutually spaced on an arc and selected 2D LiDAR, and determining laser points and the range of the blended sector; performing coordinate transformation according to the trunk distance L obtained by the horizontal scanning LiDAR to obtain a trunk distance D to the vertical scanning LiDAR; and obtaining the upper height limit H of the fruit tree through the vertical scanning LiDAR, and obtaining, according to angles θ and distances ρ of the laser points, the trunk distance D and the upper height limit H of the fruit tree, an included angle β between a diagonal of an effective target region and a/axis and distances from the laser points to a trunk boundary:

$$\beta = \arctan\frac{H}{D}$$

where, β is an included angle between the Z axis of the LiDAR and the upper height limit of a target detected; angles of data points returned from the laser points are transformed, and an angular coordinate system is wholly rotated counterclockwise by 90° to take a horizontal right of the mounting position of the LiDAR as a 0° positive direction:

$$r_{ij} = \begin{cases} \cos^{-1}\alpha * D, & \alpha \leq \beta \\ \sin^{-1}\alpha * H, & \beta < \alpha < 90° \\ H, & \alpha = 90° \end{cases}$$

where $r_{ij}$ is a distance from the LiDAR to a position on the trunk boundary corresponding to the LiDAR data at a jth in an ith sector, and $\alpha$ is an included angle between each of the laser points upon transformation of the angular coordinate system and the Z axis:

$$\begin{cases} \rho_{ij} > r_{ij} \\ \theta < \theta_{min} \\ \theta > \theta_{max} \end{cases}$$

where, $\rho_{ij}$ is a distance from the LiDAR to a detected object, $\theta$ is an angle corresponding to a current laser point, and $\theta_{min}$ and $\theta_{max}$ are respectively a minimum angle and a maximum angle of the blended sector; and when any condition in the above formula is satisfied, there is an ineffective laser data point beyond the threshold range, and the ineffective laser data point is not calculated subsequently for area and volume, but is filtered directly.

Further, the step 3 specifically includes:

calculating, after obtaining the included angle $\beta$ between the Z axis of the vertical scanning LiDAR and the upper height limit of the fruit tree and the distance r from each of laser points to the trunk boundary, and filtering an ineffective data point according to the preset threshold range in the step 2, an area S of the fruit tree in each of the regions online according to effective LiDAR data, where the LiDAR has an angular resolution of $\theta$ ; according to a distance $r_{ij}$ from the LiDAR to the position on the trunk boundary corresponding to the LiDAR data at the jth in the ith sector in the step 2, a distance $l_{ij}$ to the current laser point and the angular resolution $\theta$, an area $S_1$ of a sector between the current laser point and a next laser point on the trunk boundary and an area $S_2$ of a sector on an outer layer of the tree canopy may be respectively inferred, an area S of a sector corresponding to the current laser point is obtained by subtracting $S_2$ from $S_1$, and areas of laser points within the range of the blended sector are cumulatively added to obtain an area $S_i$ of the blended sector:

$$S_i = \frac{\sum (r_{ij}^2 - l_{ij}^2)\theta\pi}{360}$$

where, $S_i$ is an area of the ith sector, in unit of m²; $l_{ij}$ is a distance from the LiDAR to a position on the outer layer of the target corresponding to the LiDAR data at the jth in the ith sector; $r_{ij}$ is the distance from the LiDAR to the position on the trunk boundary corresponding to the LiDAR data at the jth in the ith sector; and $\theta$ is the angular resolution of the LiDAR; and a target area corresponding to the spraying region is obtained according to a sector area calculating formula.

Further, the step 4 specifically includes:

with the area of each of the spraying regions corresponding to each frame of laser data of the tree canopy calculated online according to the step 3, for purposes of matching a response time of each of a solenoid valve and improving an accuracy of a three-dimensional (3D) model of a target tree, constructing the 3D model of the target tree with a cumulative method to obtain a volume: taking n frames of data in a continuous scanning mode of the LiDAR as one spray unit; and taking maximum areas of the spraying regions in the n frames of data as areas of the spraying regions in the spray unit to prevent omission of a target due to a gap:

$$n = \text{ceil}\left(\frac{t_{solenoid\ valve}}{t_{lidar}}\right)$$

where, $t_{solenoid\ valve}$ is the response time of the solenoid valve, $t_{lidar}$ is a scanning time for one frame of LiDAR data, and ceil( ) is a function for rounding up to an integer; in order to obtain a maximum sector area, an area detected each time is temporarily stored to an array; after n area arrays are detected, areas for the spraying regions in the n area arrays are compared, and a maximum area for each of the spraying regions is taken as an area of the region in the spray unit; a time required by each of laterally segmented minimum units is the scanning time $t_{lidar}$ for one frame of the LiDAR data; the sprayer has a speed of v; and by taking n laterally segmented minimum units as the spray unit, a width W of the spray unit is calculated, to obtain a volume of each of sector grids in the spray unit of the tree canopy:

$$W = n * t_{lidar} * v$$

$$V_i = n * t_{lidar} * v * S_i$$

where, n is a LiDAR scanning number in one spray unit, $t_{lidar}$ is the scanning time for one frame of the LiDAR data, v is the travel speed of the variable-rate sprayer. $S_i$ is the maximum area of the spraying region in one spray unit, and $V_i$ is the volume of each of the sector grids in the spray unit of the tree canopy; and volumes of all sector grids are cumulatively added to obtain a volume at a single side of the tree canopy.

The present disclosure provides a variable-rate spray control system based on an annular application structure, including a variable-rate spray unit of the annular application structure, a power module 1, a vertical scanning LiDAR 2, a horizontal scanning LiDAR 3, an embedded computer 4, a speed sensor 5, and a master controller 6, where before a variable-rate spray operation of the variable-rate spray unit of the annular application structure, a water tank switch 9 for the variable-rate spray unit is turned on, such that a spray from a spray tank 8 flows through the water tank switch 9 and a filter 10, and the spray is boosted by a mechanical pump 11 and sequentially flows to a pressure sensor 15, a semicircular sprayer boom and a plurality of nozzles 16 on the sprayer boom; a back surface of the sprayer boom is curved and surrounds a blast blower 17 in a contactless manner; a relief valve 12 and a drainage switch 13 are sequentially arranged between the mechanical pump 11 and the pressure sensor 15; after the variable-rate spray control system acquires information and processes the information, the embedded computer 4 calculates duty cycles of variable-rate spray solenoid valves 7 respectively according to a calculated TCV; the master controller 6 drives the variable-rate spray solenoid valves 7 according to an instruction, such that the spray flows out from the variable-rate spray solenoid valves 7, with droplets blowing to a target through the blast blower 17; in use, an output pressure of the pressure sensor 15 is observed, and the relief valve 12 is adjusted to output a desired water pressure; a backflow output from the relief valve 12 flows to the spray tank 8; and the spray is uniformly mixed through a jet agitator 14; and the power module 1 supplies power to an upper processing device; the embedded computer 4 acquires data from the vertical scanning LiDAR 2, the horizontal scanning LiDAR 3 and the speed sensor 5 through an ROS; upon completion of information acquisition, the embedded computer 4 serves as an information processing unit to process the data; after data of the horizontal scanning LiDAR 3 is clustered by the embedded computer 4, a distance from a tree center to the horizontal scanning LiDAR 3 can be obtained; upon coordinate transformation, a distance from the vertical scanning LiDAR to the tree center is obtained; in combination with information from three sensors and according to a TCV calculation method for variable-rate spray based on the annular application structure, the embedded computer 4 obtains the TCV, and further calculates corresponding output flows of the nozzles and the duty cycles of the solenoid valves; a generated instruction is sent to the master controller 6 through a serial port; and the master controller 6 controls the variable-rate spray solenoid valves 7 independently according to the instruction, to realize a variable-rate spray function.

Further, both the vertical scanning LiDAR 2 and the horizontal scanning LiDAR 3 use OLEI LR-1BS2 2D LIDAR; the LR-1BS2 LiDAR has an effective working angle of 45-315° and an angular resolution of 0.225°, and generates 1200 valid distance data points ranging from 200-1400 in each work cycle; the LR-1BS2 LiDAR has a scanning cycle of 50 ms in response to a scanning frequency of 20 Hz; the vertical scanning LiDAR is horizontally collinear with the blast blower 17 and 0.8 m above the ground; the horizontal scanning LiDAR is provided directly below the vertical scanning LiDAR and 0.6 m above the ground; and the speed sensor 5 acquires speed information of a variable-rate sprayer with a global positioning system (GPS).

The present disclosure has the following beneficial effects.

1. The TCV calculation method for the variable-rate sprayer with the annular application structure directly uses polar coordinates of the LiDAR for calculation, which can calculate the TCV more quickly, is applicable to various working environments such as orchards, nurseries and vineyards, and makes the detection of the sprayer more universal and accurate.

2. With the combination of the horizontal/vertical scanning LiDAR, the present disclosure makes a robot better understand the working environment. The horizontal scanning LiDAR can detect the distance from the trunk to the LiDAR dynamically and early. According to the distance, the vertical scanning LiDAR can match with the continuous change of plant characteristics to calculate a TCV online.

3. By dividing the spraying regions, the present disclosure independently calculates the volume corresponding to each nozzle. In combination with the annular application structure and scanning characteristics of the LiDAR, the present disclosure calculates the region corresponding to each nozzle, which is favorable to subsequently calculate output flows of the nozzles and duty cycles of the solenoid valves, and provides a basis for variable-rate spray control on the independent nozzles.

4. The present disclosure constructs the 3D model for the tree canopy with a cumulative method, and takes n minimum segmentation units as one spray unit, thereby matching the response time of the solenoid valves, preventing omission due to a gap of the canopy, and improving the accuracy of the TCV calculation.

In the figures: 1—power module, 2—vertical scanning LiDAR, 3—horizontal scanning LiDAR, 4—embedded computer, 5—speed sensor, 6—master controller, 7—solenoid valve, 8—spray tank, 9—water tank switch, 10—filter, 11—mechanical pump, 12—relief valve, 13—drainage switch, 14—jet agitator, 15—pressure sensor, 16—nozzle, 17—blast blower, 18—spraying region.

DETAILED DESCRIPTION OF THE EMBODIMENTS

The following further describes the present disclosure in detail with reference to the examples and the accompanying drawings, but implementations of the present disclosure are not limited thereto.

Figure 1:
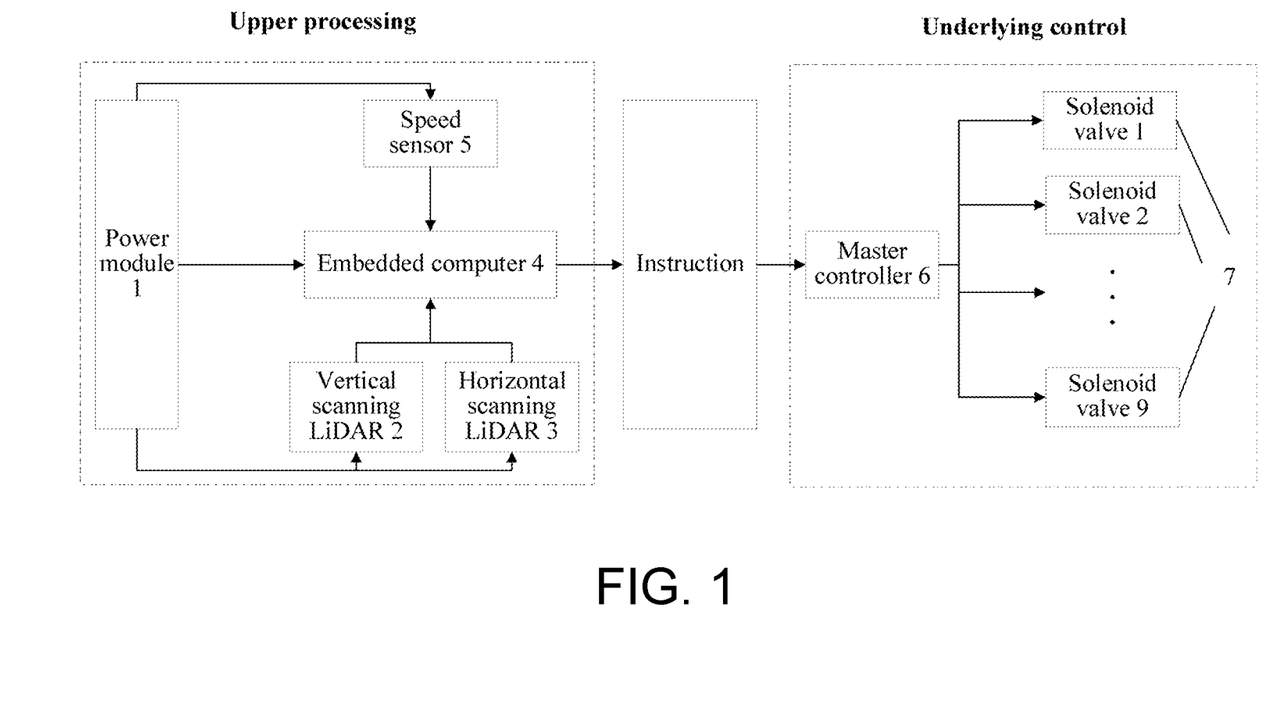
FIG. 1 is a schematic view illustrating a variable-rate spray control system based on an annular application structure.

As shown in FIG. 1, an example provides a variable-rate spray control system based on an annular application structure, including an information acquisition unit, an information processing unit, and a variable-rate spray execution unit.

The variable-rate spray control system based on the annular application structure includes the information acquisition unit, the information processing unit, and the variable-rate spray execution unit. The information acquisition unit includes a vertical scanning LiDAR 2, a horizontal scanning LiDAR 3, and a speed sensor 5. In the example, both the vertical scanning LiDAR 2 and the horizontal scanning LiDAR 3 use OLEI LR-1BS2 2D LIDAR. The LR-1BS2 LiDAR has an effective working angle of 45-315° and an angular resolution of 0.225°, and generates 1200 valid distance data points ranging from 200-1400 in each work cycle. The LR-1BS2 LiDAR has a scanning cycle of 50 ms in response to a scanning frequency of 20 Hz. The vertical scanning LiDAR is horizontally collinear with the blast blower 17 and 0.8 m above the ground. The horizontal scanning LiDAR is provided directly below the vertical scanning LiDAR and 0.6 m above the ground. The speed sensor 5 acquires speed information of a variable-rate sprayer with a GPS.

A power module 1 supplies power to an upper processing device. An embedded computer 4 acquires data from the vertical scanning LiDAR 2, the horizontal scanning LiDAR 3 and the speed sensor 5 through an ROS. Upon completion of information acquisition, the embedded computer 4 serves as an information processing unit to process the data. After data of the horizontal scanning LiDAR 3 is clustered by the embedded computer 4, a distance from a tree center to the horizontal scanning LiDAR 3 can be obtained. Upon coordinate transformation, a distance from the vertical scanning LiDAR to the tree center is obtained. In combination with information from three sensors and according to a TCV calculation method for variable-rate spray based on an annular application structure in FIG. 3, the embedded computer 4 obtains a TCV, and further calculates corresponding output flows of nozzles and duty cycles of solenoid valves. A generated instruction is sent to a master controller 6 through a serial port. The master controller 6 controls the variable-rate spray solenoid valves 7 independently according to the instruction, to realize a variable-rate spray function.

Figure 2:
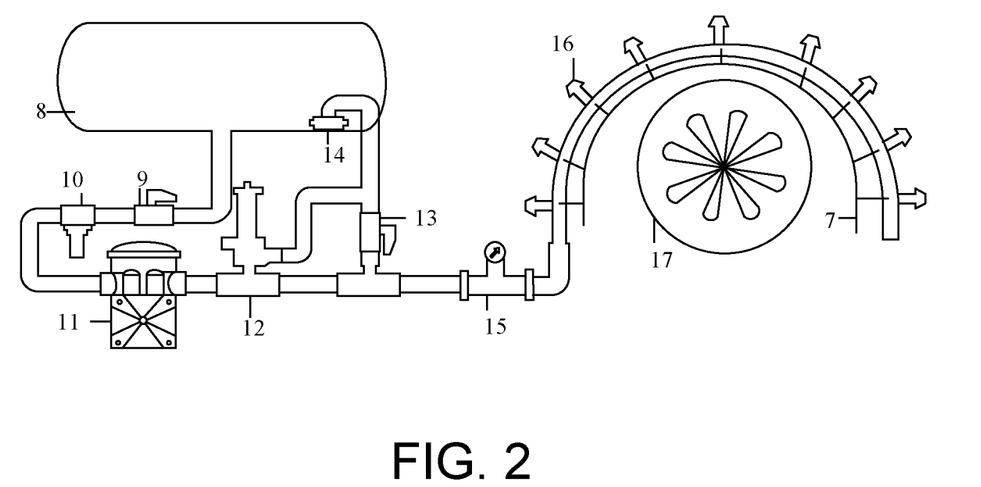
FIG. 2 is a schematic structural view illustrating a variable-rate spray unit based on an annular application structure.

FIG. 2 is a schematic structural view illustrating a variable-rate spray unit based on an annular application structure. A water tank switch 9 for the variable-rate spray unit is turned on before a variable-rate spray operation, such that a spray from a spray tank 8 flows through the water tank switch 9 and a filter 10, and the spray is boosted by a mechanical pump 11 and flows to a pressure sensor 15. After the variable-rate spray control system acquires information and processes the information, the embedded computer 4 calculates the duty cycles of the variable-rate spray solenoid valves 7 according to the calculated TCV. The master controller 6 drives the variable-rate spray solenoid valves 7 according to the instruction, such that the spray flows out from the variable-rate spray solenoid valves 7, with droplets blowing to a target through the blast blower 17. In use of the variable-rate spray control system, an output pressure of the pressure sensor 15 is observed, and the relief valve 12 is adjusted to output a desired water pressure. A backflow output from the relief valve 12 flows to the spray tank 8. The spray is uniformly mixed through a jet agitator 14.

Figure 3:
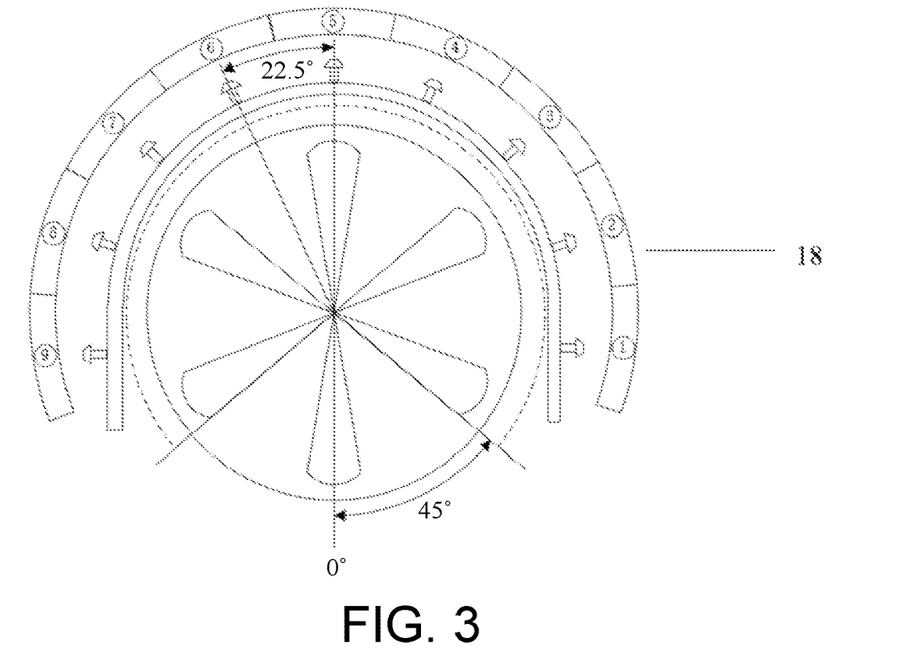
FIG. 3 is a schematic view illustrating division of variable-rate spraying regions based on an annular application structure.

FIG. 3 is a schematic view illustrating division of variable-rate spraying regions based on an annular application structure. The LR-1BS2 LiDAR has an effective working angle of 45-315° and an angular resolution of 0.225°, and generates 1200 valid distance data points ranging from 200-1400 in each work cycle. In the example, the nozzles on the annular application structure of the variable-rate sprayer are mutually spaced by 22.5° on an arc, with an inner inclination angle being 10°. Upon calculation, a laser point range of 312-1.288 is to be used, and a blended sector falls into a range of 70-290.25°. Corresponding laser points and angles of regions 1-9 in the spraying region 18 are as follows: The sector 1 corresponds to 312-446 data points, with an angle of 70-101.25°. The sector 2 corresponds to 447-547 data points, with an angle of 101.5-123.75°. The sector 3 corresponds to 548-648 data points, with an angle of 124-146.25°. The sector 4 corresponds to 649-749 data points, with an angle of 146.5-168.75°. The sector 5 corresponds to 750-850 data points, with an angle of 169-191.25°. The sector 6 corresponds to 851-951 data points, with an angle of 191.5-213.75°. The sector 7 corresponds to 952-1,052 data points, with an angle of 214-236.25°. The sector 8 corresponds to 1,053-1.153 data points, with an angle of 236.5-258.75°. The sector 9 corresponds to 1,154-1.288 data points, with an angle of 259-290.25°.

Figure 4:
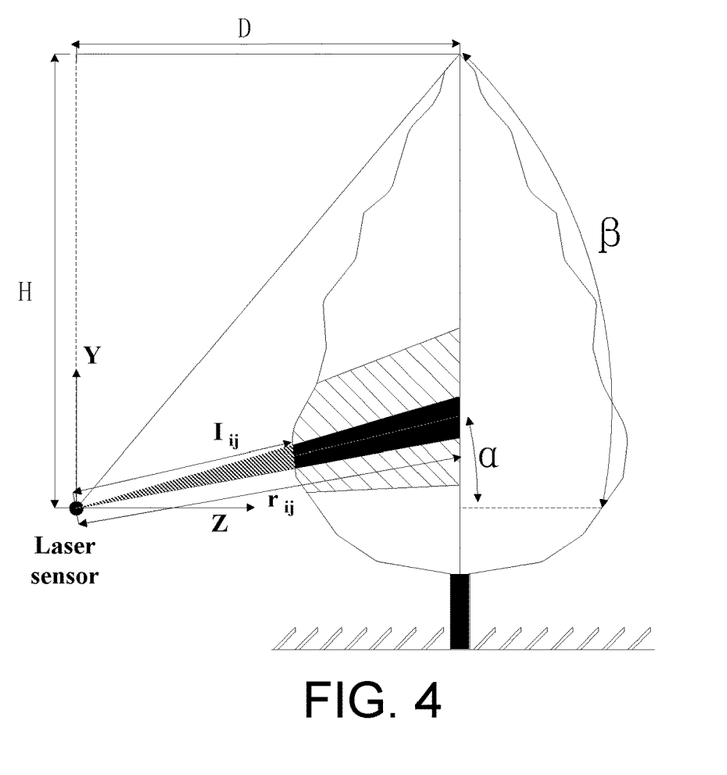
FIG. 4 is a schematic view illustrating calculation of a sector area of a target tree canopy.

FIG. 4 is a schematic view illustrating calculation of a sector area of a target tree canopy. The vertical scanning LiDAR 2 is 0.8 m above the ground, and segments a tree canopy longitudinally (in a yz plane) in consecutive scanning cycles. As can be seen from FIG. 2, the detection angle of the LiDAR is divided into nine sub-regions. Areas of the sub-regions are calculated respectively according to a preset condition. According to an upper height limit H of a tree obtained in scanning of the vertical scanning LiDAR 2, and a distance D from a trunk to the LiDAR in clustering of the horizontal scanning LiDAR 3, an included angle β between the vertical scanning LiDAR 2 and the upper height limit of the tree can be obtained. An included angle α between the vertical scanning LiDAR 2 and the Z axis is compared with the β to obtain a distance r from a current laser point to a tree boundary. The LR-1BS2 LiDAR has the angular resolution of 0.225°. According to a formula for an area of a sector, an area of a sector corresponding to each laser point in the sub-region can be calculated:

$$S = \frac{0.225 * \pi (r^2 - l^2)}{360}$$

where, r is the distance from the current laser point to the tree boundary, and l is a distance from the laser point to an outer layer of the tree canopy. Areas S corresponding to all laser points in a same sector are cumulatively added to obtain a total area of the spraying sub-region.

$$S_i = \frac{\sum (r_{ij}^2 - l_{ij}^2)\pi}{1600}$$

where, $S_i$ is an area of an ith sector, in unit of m²; $l_{ij}$ is a distance from the LiDAR to a position on the outer layer of the target corresponding to the LiDAR data at the jth in the ith sector; $r_{ij}$ is a distance from the LiDAR to a position on a trunk boundary corresponding to the LiDAR data at the jth in the ith sector.

Figure 5:
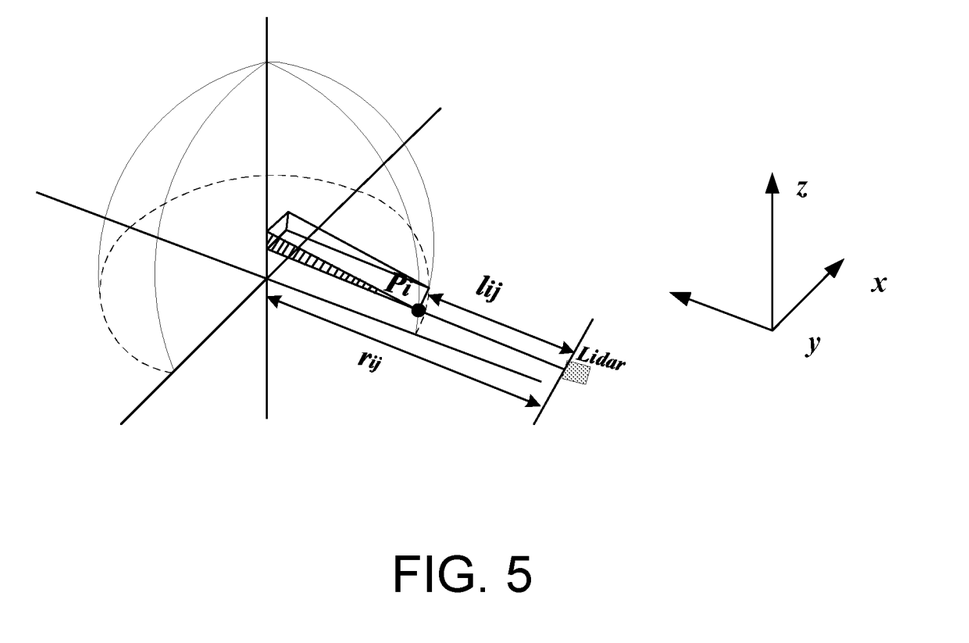
FIG. 5 is a schematic view illustrating TCV measurement.

FIG. 5 is a schematic view illustrating TCV measurement. At an ith point, the vertical scanning LiDAR 2 reflects distance and angle information of a point P on the outer layer of the tree canopy. The embedded computer 4 calculates a distance l from the point P to the LiDAR. According to FIG. 4, a distance r from the LiDAR to the trunk boundary can be calculated, to obtain an area of a sector corresponding to the point P. The embedded computer 4 obtains a current travel speed of the variable-rate sprayer in combination with information of the speed sensor 5, and obtains a volume V of a sector corresponding to each frame of data in combination with the scanning cycle 50 ms of the vertical scanning LiDAR 2.

$$V = 0.05 * v_{car} * S$$

Likewise, volumes of sectors corresponding to other points can also be obtained according to the above formula. All volumes in a same sector are added to obtain a total volume of the spraying sub-region. Volumes of spraying sub-regions at a same side are added to obtain a total volume at a single side of the tree canopy. In order to match response time of each of solenoid valves and prevent omission of the LiDAR due to a gap, every two frames of data are taken as a spray unit for volume calculation. A maximum area of each of spraying sub-regions in the two frames of data is used for the volume calculation.

$$V_i = 2*0.05*v_{car}*S_{i\_max}$$

where, $V_i$ is the area of the spraying sub-region, $v_{car}$ is the travel speed of the variable-rate sprayer, the LiDAR has a scanning cycle of 0.05 s, and $S_{i\_max}$ is a maximum area of a sector between every two frames. According to the above formula, the volume of each spraying region can be obtained.

Figure 6:
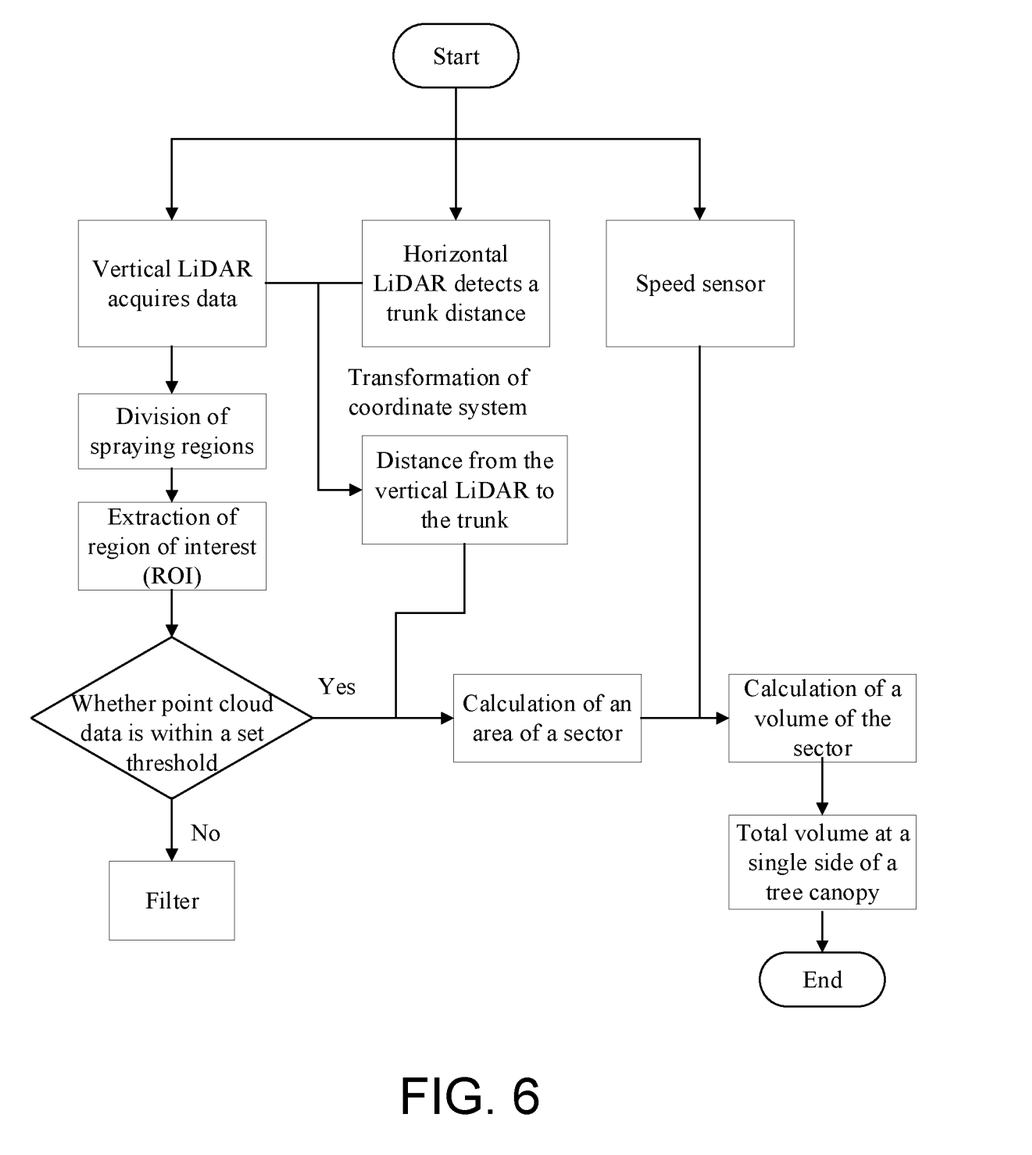
FIG. 6 is a flowchart illustrating a TCV calculation method for variable-rate spray based on an annular application structure.

FIG. 6 is a flowchart illustrating a TCV calculation method for variable-rate spray based on an annular application structure. The embedded computer 4 acquires point cloud data of an orchard environment in real time based on the ROS by using the OLEI LR-1BS2 2D vertical scanning LiDAR 2 and the OLEI LR-1BS2 2D horizontal scanning LiDAR 3. The LR-1BS2 horizontal scanning LiDAR performs clustering on a trunk to obtain a distance L from the trunk to the horizontal scanning LiDAR. With coordinate transformation, a distance D from the vertical LiDAR to the trunk is obtained. As can be seen from FIG. 3, the LR-1BS2 LiDAR has an effective working angle of 45-315° and an angular resolution of 0.225°, and generates 1200 valid distance data points ranging from 200-1400 in each work cycle. In the example, the nozzles on the annular application structure of the variable-rate sprayer are mutually spaced by 22.5° on an arc, with an inner inclination angle being 10°. Upon calculation, a laser point range of 312-1,288 is used, and a blended sector falls into a range of 70-290.25°. A condition is set according to the divided spraying regions. Each frame of the point cloud data is calculated by traversing laser point clouds. Since the LR-1BS2 LiDAR has an angular resolution of 0.225°, a next point cloud can be inferred. An area between adjacent point clouds is calculated. Areas in a same spraying region are added to obtain a total area for frames of data in the spraying region. A calculated result is stored to an area array. The solenoid valve has response time of 100 ms, and the LR-1BS2 LiDAR has a scanning frequency of 20 Hz and a scanning cycle $t_{lidar}$ of 50 ms, so every two frames of data are taken as a spray unit in the example. In order to prevent omission of the LiDAR due to the gap of the canopy from affecting the accuracy, area arrays for every two frames are compared. A maximum area of the spraying region is used. According to the travel speed v of the sprayer obtained by the speed sensor, a volume of a sector grid corresponding to each spraying region in the spray unit can be obtained, and the result is stored to a dynamic array, thereby continuously calculating the TCV online.

Content not mentioned in the present disclosure shall be a widely-known technology.

In the description of the present specification, the description with reference to the terms "one embodiment", "some embodiments", "an illustrative embodiment", "an example", "a specific example", or "some examples" means that specific features, structures, materials or characteristics described in connection with the embodiment or example are included in at least one embodiment or example of the present disclosure. In this specification, the schematic representations of the above-mentioned terms do not necessarily refer to the same embodiment or example. Moreover, the described specific features, structures, materials or characteristics can be combined in any one or more embodiments or examples in a suitable manner.

Although the examples of the present disclosure have been illustrated, it should be understood that those of ordinary skill in the art may still make various changes, modifications, replacements, and variations to the above examples without departing from the principle and spirit of the present disclosure, and the scope of the present disclosure is limited by the claims and legal equivalents thereof.

What is claimed is:

1. A tree canopy volume calculation method for variable-rate spray based on an annular application structure, comprising the following steps:
step 1: acquiring, by a robot operating system (ROS), environmental information of an orchard in real time by using vertical/horizontal scanning LiDAR, detecting a trunk distance by using the horizontal scanning LiDAR through point-cloud clustering, and acquiring, by a speed sensor, a real-time travel speed of a sprayer with an annular application structure; step 2: dividing spraying regions according to characteristics of the annular application structure and parameters of the vertical scanning LiDAR, the regions respectively corresponding to spraying ranges of nozzles, and setting a threshold range through trunk distance information obtained by horizontal laser clustering, in combination with an angle range of a blended sector, a mounting position of the vertical scanning LiDAR, and an upper height limit of a fruit tree; step 3: calculating effective laser point clouds within the threshold range, segmenting a tree canopy longitudinally in a manner of a laser scanning cycle, and calculating, according to adjacent point clouds in each of the spraying regions, a sector area of each of the spraying regions; and step 4: taking n consecutive frames of LiDAR data as a spray unit, taking a maximum area for the n frames of data as an area of the spray unit, and obtaining a tree canopy volume in combination with speed information from the speed sensor and a scanning cycle of the LiDAR, wherein the step 2 specifically comprises: providing centers of the vertical LiDAR and the application structure on the same horizontal line, to avoid unnecessary correction; dividing the spraying regions according to an angle at which contacts of the nozzles on the annular application structure are mutually spaced on an arc and selected two-dimensional LiDAR, and determining laser points and the range of the blended sector; performing coordinate transformation according to a trunk distance L obtained by the horizontal scanning LiDAR to obtain a trunk distance D to the vertical scanning LiDAR; and obtaining the upper height limit H of the fruit tree through the vertical scanning LiDAR, and obtaining, according to angles θ distances p of the laser points, the trunk distance D and the upper height limit H of the fruit tree, an included angle β between a diagonal of an effective target region and a Z axis and distances from the laser points to a trunk boundary:

$$\beta = \arctan\frac{H}{D}$$

wherein, β is an included angle between the Z axis of the LiDAR and the upper height limit of a target detected, angles of data points returned from the laser points are transformed, and an angular coordinate system is wholly rotated counterclockwise by 90° to take a horizontal right of the mounting position of the LiDAR as a 0° positive direction:

$$r_{ij} = \begin{cases} \cos^{-1}\alpha * D, & \alpha \leq \beta \\ \sin^{-1}\alpha * H, & \beta < \alpha < 90° \\ H, & \alpha = 90° \end{cases}$$

wherein, $r_{ij}$ is a distance from the LiDAR to a position on the trunk boundary corresponding to the LiDAR data at a jth in an ith sector, and $\alpha$ is an included angle between each of the laser points upon transformation of the angular coordinate system and the Z axis:

$$\begin{cases} \rho_{ij} > r_{ij} \\ \theta < \theta_{min} \\ \theta > \theta_{max} \end{cases}$$

wherein, $P_{ij}$ is a distance from the LiDAR to a detected object, $\theta$ is an angle corresponding to a current laser point, and $\theta_{min}$ and $\theta_{max}$ are respectively a minimum angle and a maximum angle of the blended sector; and when any condition in the above formula is satisfied, there is an ineffective laser data point beyond the threshold range, and the ineffective laser data point is not calculated subsequently for area and volume, but is filtered directly.

2. The tree canopy volume calculation method for variable-rate spray based on the annular application structure according to claim 1, wherein the step 3 specifically comprises:
calculating, after obtaining the included angle β between the Z axis of the vertical scanning LiDAR and the upper height limit of the fruit tree and the distance r from each of laser points to the trunk boundary, and filtering an ineffective data point according to the preset threshold range in the step 2, an area S of the fruit tree in each of the regions online according to effective LiDAR data, wherein the LiDAR has an angular resolution of θ ; according to the distance $r_{ij}$ from the LiDAR to the position on the trunk boundary corresponding to the LiDAR data at the jth in the ith sector in the step 2, a distance $l_{ij}$ to the current laser point and the angular resolution θ , an area $S_1$ of a sector between the current laser point and a next laser point on the trunk boundary and an area $S_2$ of a sector on an outer layer of the tree canopy are respectively inferred, an area S of a sector corresponding to the current laser point is obtained by subtracting $S_2$ from $S_1$, and areas of laser points within the range of the blended sector are cumulatively added to obtain an area $S_i$ of the blended sector.

3. The tree canopy volume calculation method for variable-rate spray based on the annular application structure according to claim 2, wherein the area $S_i$ of the blended sector is given by:

$$S_i = \frac{\sum (r_{ij}^2 - l_{ij}^2)\theta\pi}{360}$$

wherein, $S_i$ is an area of the ith sector, in unit of m²; $l_{ij}$ is a distance from the LiDAR to a position on the outer layer of the target corresponding to the LiDAR data at the jth in the ith sector; $r_{ij}$ is the distance from the LiDAR to the position on the trunk boundary corresponding to the LiDAR data at the jth in the ith sector; θ is the angular resolution of the LiDAR; and a target area corresponding to the spraying region is obtained according to a sector area calculating formula.

4. The tree canopy volume calculation method for variable-rate spray based on the annular application structure according to claim 1, wherein the step 4 specifically comprises:
with the area of each of the spraying regions corresponding to each frame of laser data of the tree canopy calculated online according to the step 3, for purposes of matching a response time of a solenoid valve and improving an accuracy of a three-dimensional model of a target tree, constructing the three-dimensional model of the target tree with a cumulative method to obtain a volume: taking n frames of data in a continuous scanning mode of the LiDAR as the spray unit; and taking maximum areas of the spraying regions in the n frames of data as areas of the spraying regions in the spray unit to prevent omission of a target due to a gap:

$$n = \text{ceil}\left(\frac{t_{solenoid\ valve}}{t_{lidar}}\right)$$

wherein, $t_{solenoid\ valve}$ is the response time of the solenoid valve, $t_{lidar}$ is a scanning time for one frame of LiDAR data, and ceil () is a function for rounding up to an integer; in order to obtain a maximum sector area, an area detected each time is temporarily stored to an array; after n area arrays are detected, areas for the spraying regions in the n area arrays are compared, and a maximum area for each of the spraying regions is taken as an area of the region in the spray unit; a time required by each of laterally segmented minimum units is the scanning time $t_{lidar}$ for one frame of the LiDAR data; the sprayer has a speed of v; and by taking n laterally segmented minimum units as the spray unit, a width W of the spray unit is calculated, to obtain a volume of each of sector grids in the spray unit of the tree canopy:

$$W = n * t_{lidar} * v$$

$$V_i = n * t_{lidar} * v * S_i$$

wherein, n is a LiDAR scanning number in one spray unit, $t_{lidar}$ is the scanning time for one frame of the LiDAR data, v is the travel speed of the variable-rate sprayer, $S_i$ is the maximum area of the spraying regions in one spray unit, and $V_i$ is the volume of each of the sector grids in the spray unit of the tree canopy; and volumes of all sector grids are cumulatively added to obtain a volume at a single side of the tree canopy.

* * * * *